Patented May 23, 1939

2,159,367

UNITED STATES PATENT OFFICE 2,159,367

STABILIZATION OF CELLULOSE ETHERS

Shailer L. Bass and Howard N. Fenn, Midland, Mich., and Floyd C. Peterson, Syracuse, N. Y., assignors to The Dow Chemical Company, Midland, Mich., a corporation of Michigan No Drawing. Application December 9, 1937, Serial No. 178,960

12 Claims. (Cl. 260—232)

This invention relates to a method whereby cellulose ethers may be made resistant to such oxidation and embrittlement as usually result when such ethers are heated to temperatures above their softening point, and to the product thereby produced.

Cellulose ethers have been available for some time which resist thermal decomposition at temperatures up to about 120° C. even when such temperatures are maintained for from 12 to 24 hours, or longer. One method of expressing the stability is in terms of the per cent of the original viscosity of a cellulose ether which is retained when a film thereof is subjected to a temperature of 120° C. for 16 hours. When high stability is indicated by this test, the cellulose ether is generally satisfactory for films or foils where flexibility is a prime requisite and where the product will not be subjected to more strenuous conditions of temperature. Cellulose ethers which are to be molded at temperatures above their softening point must possess greater stability than can be measured in the 120°–16 hour test. At present, most of the commercially available cellulose ethers which meet the requirements of the 120° test are found to be subject to oxidation, discoloration, and embrittlement after exposure to temperatures above the softening point of such materials, i. e. in the range from about 130° to about 200° C. The importance of cellulose ether compositions in the preparation of molding plastics is of increasing importance. It is necessary therefore to provide cellulose ethers which will not be discolored as a result of the molding operation or which will not show other effects of high temperatures, such as embrittlement, after the molding operation has been performed.

It is, accordingly, among the objects of the invention to provide a process whereby cellulose ethers may be stabilized to such an extent that they may be satisfactorily employed in molding operations, and the like, at temperatures above their softening point, i. e. ordinarily in the range from 130° to 200° C. and more particularly, from 150° to 180° C.

It is a further object of the invention to provide a cellulose ether which is resistant to thermal oxidation and to embrittlement resulting from such oxidation.

We have now found that the foregoing objects may be readily attained by subjecting cellulose ethers to hydrogenation in a non-reducible solvent therefor over a hydrogenation catalyst, such as nickel, or copper chromite. This process applies primarily to cellulose ethers having viscosity above 30 centipoises when measured on a 5% solution thereof in 80 parts of toluene and 20 parts of ethanol, by volume, and will produce cellulose ethers which retain more than 80 per cent of their original viscosity when heated in contact with air for 50 minutes at 170° C. We have found that a cellulose ether that passes this test is entirely satisfactory for employment in mold-in compositions, especially those used in injection molding operations where temperatures of 150° to 180° C. are commonly encountered.

The invention may readily be understood from the following examples which are, however, given by way of illustration and are not to be construed as limiting:

Example 1

300 grams of a 15 per cent solution of crude ethyl cellulose in 95 per cent ethanol was placed in a pressure vessel which was provided with a hydrogen inlet and a means of agitation. There was introduced into the vessel a pyrophoric nickel catalyst which had been prepared by slow reduction of nickel hydroxide supported on an inert, finely divided carrier at a temperature of about 400° C. The amount of nickel employed in this particular example was approximately 2.5 per cent of the weight of the ethyl cellulose in solution. The reactor was securely closed and was heated to a temperature of about 125° C. while hydrogen pressure of approximately 490–500 pounds was maintained in the vessel. At the end of an hour the temperature of the reactor content had increased to about 156° C. without external application of heat, due to the exothermic hydrogenation reaction, and the hydrogen pressure within the vessel had decreased to about 470 pounds per square inch.

The hydrogen pressure was maintained in the vessel while the reactor was cooled to room temperature and was then released. The reactor content was diluted to about a liter with 95 per cent alcohol and the dilute solution allowed to stand until the catalyst had completely settled out, after which the ethyl cellulose-containing solution was decanted from the catalyst and poured into several times its volume of water to precipitate the ethyl cellulose, which was then washed with further quantities of water, dried, and subjected to a stability test at 170° C. for 50 minutes. A sample of the original crude ethyl cellulose, which had not been subjected to hydrogenation, was tested for stability under the same conditions. The material prior to hydrogenation had a viscosity of approximately 32 centipoises when measured in a 5 per cent solution thereof, by weight, in a mixture of 80 parts of toluene and 20 parts of ethanol, by volume. When this material was heated to 170° C. for 50 minutes, the viscosity had been reduced to 10.2 centipoises, indicating a stability of about 32 per cent. After hydrogenation the ethyl cellulose had a viscosity of 38 centipoises. When this material was subjected to the stability test, a final viscosity of 38 centipoises was obtained, indicating the material was 100 per cent stable.

*Example 2*

310 grams of a 95 per cent ethanol solution of a crude ethyl cellulose similar to that employed in the previous example was subjected to hydrogenation at 160° C. under 500 pounds per square inch hydrogen pressure in the presence of 0.45 grams of a copper chromite catalyst stabilized with barium in a manner described by Connor et al., J. A. C. S., 54, 1144 (1932). Hydrogenation was continued for an hour and the product recovered from the reaction vessel in a manner similar to that described above. Following hydrogenation the ethyl cellulose had a viscosity of 31.8 centipoises. When a sample of this material was heated to a temperature of 170° C. for 50 minutes it had a viscosity of 31.5 centipoises, indicating a stability of 99 per cent.

*Example 3*

In a similar manner, 40.4 grams of benzyl cellulose was dissolved in about 230 grams of dioxan and hydrogenated under 500 pounds per square inch in the presence of 0.4 grams of a copper chromite catalyst at temperatures between 159° and 165° C. for 1 hour. The benzyl cellulose recovered after hydrogenation was 86 per cent stable as compared with a 34 per cent stability for the benzyl cellulose prior to treatment.

The invention has been illustrated with respect to stabilization of ethyl cellulose and benzyl cellulose by hydrogenation over nickel and copper chromite catalysts, but is also applicable to the stabilization of other cellulose ethers, whether alkyl ethers such as methyl cellulose or propyl cellulose, aralkyl ethers, or mixed alkyl-aralkyl ethers, such as benzyl ethyl cellulose, and the process may be carried out employing other hydrogenation catalysts such as palladium or platinum catalysts. The temperature of hydrogenation does not appear to be critical when treating alkyl ethers of cellulose, but for best results temperatures above about 100° C. and below 200° C. are employed, and in general, a temperature of about 160° C. is satisfactory.

When nickel catalysts have been employed, the amount of catalyst used is ordinarily between about 2 and about 8 per cent of the weight of the cellulose ether being treated, while with copper chromite or similar catalysts it has not been found necessary to employ more than about 0.5 to 2 per cent of catalyst based on the weight of the cellulose ether. No advantage has been found in carrying out the hydrogenation for more than about an hour and in many instances completely satisfactory results are obtained with shorter reaction periods. We have ordinarily employed hydrogenation pressures of about 500 pounds per square inch but lesser or greater pressures may be employed as desired, depending somewhat upon the activity of the particular catalyst being employed. In general, pressures from 300 to 1000 pounds per square inch will be deemed most convenient because of the availability of equipment for operating at such moderate pressures. Since the results obtained from operating in this range are entirely satisfactory for our purpose it has not been found necessary to go beyond the upper limit indicated.

Other modes of applying the principle of our invention may be employed instead of those explained, change being made as regards the process herein disclosed, provided the step or steps stated by any of the following claims or the equivalent of such stated step or steps be employed.

We therefore particularly point out and distinctly claim as our invention:

1. The process which comprises subjecting a solution of a cellulose ether in a non-reducible organic solvent to the action of hydrogen at a pressure in the range from about 300 to about 1000 pounds per square inch and at a temperature in the range from about 100° to about 200° C., in the presence of a hydrogenation catalyst, and recovering the so-treated cellulose ether which is characterized by having an improved thermo-stability.

2. The process which comprises subjecting a solution of an alkyl ether of cellulose in a non-reducible organic solvent to the action of hydrogen at a pressure in the range from about 300 to about 1000 pounds per square inch, and a temperature in the range from about 100° to about 200° C., in the presence of a hydrogenation catalyst, and recovering the so-treated alkyl ether of cellulose which is characterized by having an improved thermo-stability.

3. The process which comprises subjecting a solution of an aralkyl ether of cellulose in a non-reducible organic solvent to the action of hydrogen at a pressure in the range from about 300 to about 1000 pounds per square inch, and a temperature in the range from about 100° to about 200° C., in the presence of a hydrogenation catalyst, and recovering the so-treated aralkyl ether of cellulose which is characterized by having an improved thermo-stability.

4. The process which comprises subjecting a solution of ethyl cellulose in a non-reducible organic solvent to the action of hydrogen at a pressure in the range from about 300 to about 1000 pounds per square inch, and a temperature in the range from about 100° to about 200° C., in the presence of a hydrogenation catalyst, and recovering the so-treated ethyl cellulose which is characterized by having an improved thermo-stability.

5. The process according to claim 1 wherein a nickel catalyst is employed in the amount of between about 2 and about 8 per cent based on the weight of the cellulose ether being treated.

6. The process according to claim 1 wherein the catalyst is a copper chromite.

7. The process according to claim 1 wherein the reaction time is about one hour.

8. The process which comprises dissolving a cellulose ether in 95 per cent ethanol and subjecting the solution to the action of hydrogen at a temperature in the range from about 100° to about 200° C. under a pressure of about 500 pounds per square inch for about 1 hour in the presence of a hydrogenation catalyst.

9. The process which comprises dissolving a cellulose ether in 95 per cent ethanol and subjecting the solution to the action of hydrogen at a temperature in the range from about 100° to about 200° C. under a pressure of about 500 pounds per square inch for about 1 hour in the presence of between about 2 and about 8 per cent of a nickel catalyst based on the weight of the cellulose ether being treated.

10. The process which comprises dissolving a cellulose ether in 95 per cent ethanol and subjecting the solution to the action of hydrogen at a temperature in the range from about 100° to about 200° C. under a pressure of about 500 pounds per square inch for about 1 hour in the presence of a copper chromite catalyst.

11. The process which comprises dissolving a cellulose ether in 95 per cent ethanol and subjecting the solution to the action of hydrogen at a temperature in the range from about 100° to about 200° C. under a pressure of about 500 pounds per square inch for about 1 hour in the presence of about 1 per cent by weight of a copper chromite catalyst based on the weight of the cellulose ether being treated.

12. The process which comprises subjecting a solution of ethyl cellulose in a non-reducible solvent to the action of hydrogen at a pressure of about 500 pounds per square inch and a temperature of about 160° C. in the presence of about .1 per cent of a copper chromite catalyst based on the weight of the ethyl cellulose being treated, for a period of about an hour, and recovering the so treated ethyl cellulose which, when subjected to a temperature of 170° C. for 50 minutes, retains at least 80 per cent of its original viscosity.

SHAILER L. BASS.
HOWARD N. FENN.
FLOYD C. PETERSON.